(12) United States Patent
Murugan et al.

(10) Patent No.: US 11,243,724 B2
(45) Date of Patent: Feb. 8, 2022

(54) METHODS AND SYSTEMS FOR PRINTING AN ADDRESS WITHOUT AN EXTERNAL DEVICE

(71) Applicant: XEROX CORPORATION, Norwalk, CT (US)

(72) Inventors: Sakthivel Murugan, Tirunelveli (IN); Hariprasad Thiruthamarai Seshamani, Chennai (IN); Murugesan Pandi, Madurai (IN); Muthukumar Periyasamy, Tiruppur (IN); Uma Mageswari Mariyappan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/568,475

(22) Filed: Sep. 12, 2019

(65) Prior Publication Data

US 2021/0081150 A1    Mar. 18, 2021

(51) Int. Cl.
*G06F 3/12* (2006.01)
*H04N 1/00* (2006.01)

(52) U.S. Cl.
CPC ............ *G06F 3/122* (2013.01); *G06F 3/1243* (2013.01); *G06F 3/1254* (2013.01); *G06F 3/1257* (2013.01)

(58) Field of Classification Search
CPC ...... G06F 40/174; G06F 3/122; G06F 3/1243; G06F 3/1254; G06F 3/1257; G06F 3/1258; G06F 3/1204
USPC .......... 358/1.11–1.18, 1.2, 1.9, 1.1; 715/739, 715/221, 222, 224
See application file for complete search history.

(56) References Cited

U.S. PATENT DOCUMENTS

| | | | | |
|---|---|---|---|---|
| 5,384,886 A * | 1/1995 | Rourke | ................. | G06F 40/174 715/202 |
| 6,459,858 B1 * | 10/2002 | Davis | ............... | G07B 17/00467 270/1.03 |
| 7,149,726 B1 * | 12/2006 | Lingle | .............. | G07B 17/00435 705/411 |
| 7,478,143 B1 * | 1/2009 | Friedman | ............... | G06Q 30/02 709/203 |
| 2002/0046129 A1 * | 4/2002 | Nakagawa | ......... | G06Q 30/0621 705/26.5 |
| 2005/0111015 A1 * | 5/2005 | Tsujimoto | ............. | G06F 3/1204 358/1.9 |
| 2005/0157330 A1 * | 7/2005 | Giuliano | ............... | G06F 3/1234 358/1.15 |
| 2011/0061802 A1 * | 3/2011 | Raming | .................... | G09F 3/10 156/256 |

(Continued)

Primary Examiner — Chad Dickerson
(74) Attorney, Agent, or Firm — Jones Robb, PLLC (57) ABSTRACT

The present disclosure discloses methods and systems for printing an address directly on an output medium. The method is implemented at a multi-function device. The method includes providing a user interface for displaying an address print option; based on receiving a selection of the address print option, displaying, by a controller, an address form requiring address details on the user interface, wherein the user provides the address details via the user interface; receiving, by the controller, the address details to be printed on the output medium; and printing, by a printing engine, the address details on the output medium based on receiving a selection of a type of the output medium. The method enables the user to print the address on the output medium without requiring an external device.

18 Claims, 6 Drawing Sheets

(56) References Cited

U.S. PATENT DOCUMENTS

| | | | | |
|---|---|---|---|---|
| 2011/0286012 A1* | 11/2011 | De Munck | ............ | G06F 3/1284 |
| | | | | 358/1.6 |
| 2012/0131885 A1* | 5/2012 | Matsushita | ............ | B43M 3/045 |
| | | | | 53/473 |
| 2016/0162966 A1* | 6/2016 | Naficy | ............... | G06Q 30/0621 |
| | | | | 705/26.5 |
| 2020/0133184 A1* | 4/2020 | Matsuura | ............... | G03G 15/23 |
| 2020/0192261 A1* | 6/2020 | Ogata | ................ | G03G 15/5062 |

\* cited by examiner

METHODS AND SYSTEMS FOR PRINTING AN ADDRESS WITHOUT AN EXTERNAL DEVICE

TECHNICAL FIELD

The presently disclosed subject matter relates to the field of printing, and more particularly to methods and systems for printing an address without an external device such as a computing device.

BACKGROUND

These days people extensively use multi-function devices (MFD) like printing devices etc., for printing, scanning, photocopying, and so forth in their offices, homes. Currently, when a user wants to print an address on an output medium, for example, a paper, an envelope, etc., then the user types the address in a word document or a notepad on a device such as a computing device, a mobile device or the like. The user then submits the document having the typed address to a printer for printing. Subsequently, the user can cut and/or paste the printed address to a shipment box. This approach requires devices, i.e., the computing device and the printer and further requires an additional effort by the user. For large logistics company, this effort, time is much more as daily thousands of shipment parcels, documents, etc., are sent. Some logistic companies have a dedicated team who just types address for example, on a word document or notepad and a different team for printing the addresses and pasting on the shipment parcels, document envelopes, etc. This approach requires huge number of resources and is not feasible. Hence, in light of the above, there arises a need for improved techniques for printing address without requiring additional devices such as a computing device.

SUMMARY

According to aspects illustrated herein, there is provided a method for printing an address directly on an output medium. The method is implemented at a multi-function device. The method includes providing a user interface for displaying an address print option. Based on receiving a selection of the address print option, an address form requiring address details on the user interface is displayed, wherein the user provides the address details via the user interface. Then, the address details to be printed on the output medium are received. Finally, the address details are printed on the output medium based on receiving a selection of a type of the output medium. In this way, the method enables the user to print the address on the output medium without requiring an external device.

According to further aspects illustrated here, a multi-function device is disclosed. The multi-function device includes a user interface, a controller and a print engine. The user interface is to display an address print option. The controller is to display an address form requiring address details on the user interface, upon receiving a selection of the address print option, wherein the user provides the address details via the user interface; and receive the address details to be printed on an output medium. The print engine is to print the received address details on the output medium based on receiving a selection of a type of the output medium, wherein the multi-function device enables the user to print the address on the output medium without requiring an external device.

According to further aspects illustrated herein, a non-transitory computer-readable medium including instructions executable by a processing resource to provide a user interface to display an address print option; provide an address form requiring address details on the user interface, wherein the user provides the address details via the user interface; receive the address details to be printed on an output medium; and print the address details on the output medium based on receiving a selection of a type of the output medium.

According to additional aspects, a method is disclosed. The method includes providing an address print option to a user; wherein the user selects the address print option; receiving a selection of the address print option; upon selection, providing an address form to be filled out by the user, the address form comprising one or more address fields and one or more print options comprising an output medium select option; receiving address details corresponding to the one or more address fields and a selection of a type of an output medium for address printing; and based on the selected output medium, printing the address details on the output medium.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below As used herein a "multi-function device" is a single device or a combination of multiple devices, to perform more than one function such as, but not limited to, scanning, printing, cutting, imaging, and so forth. The multi-function device may include software, hardware, firmware, and combination thereof. In the context of the current disclosure, the multi-function device allows a user to input/type address using the multi-function device and to print the input address on an output medium, without requiring an external input device such as a computing device.

As used herein a "user" refers to any user who has access to the multi-function device and can access one or more services of the multi-function device directly. The user may be the one who accesses the multi-function device to input and print the address on the output medium. Typically, the user here may be a sender.

The term "address form" refers to a form requiring address details. The address details may be of a receiver. In other cases, the address details may be of a sender. The address form is in a pre-defined format having one or more address fields and print options.

An "output medium" refers to a medium on which the address is printed. Non-limiting examples of the output medium includes a paper, an envelope, a fabric, a plastic. The paper may be of any size such as A4, A3, A2, A5, etc., as known or later developed sizes.

The term "envelope" includes any object including a printable substrate for any purpose, including but not limited to, adhesive shipping labels, covers, cover sheets, tags, cards, wrappers, etc.

The term "sender" refers to a user or a company sending a shipment/parcel or a courier. The "receiver" refers to a user, or a company intended to receive a shipment/parcel or courier from the sender.

Overview

The present disclosure discloses methods and systems for printing address on an output medium, without requiring an additional device. The methods and systems provide an address print option in a multi-function device. The address print option allows a user to type the address directly in the multi-function device and print the address directly on the output medium. The output medium may be a paper or an envelope.

The present disclosure is implemented when a user is to send a parcel from one person (sender) to another person (receiver). The parcel typically includes an envelope or a courier envelope which includes an item to be delivered to the receiver. The envelope includes address details of the receiver and/or sender. In existing solutions, the user either manually writes the address on the envelope or types the address in a word document and then prints the address. But with the present disclosure, the user directly types/inputs address in the multi-function device and the multi-function device prints the input address directly on the output medium such as envelope, paper or any other type of output medium.

EXEMPLARY EMBODIMENTS

Figure 1:
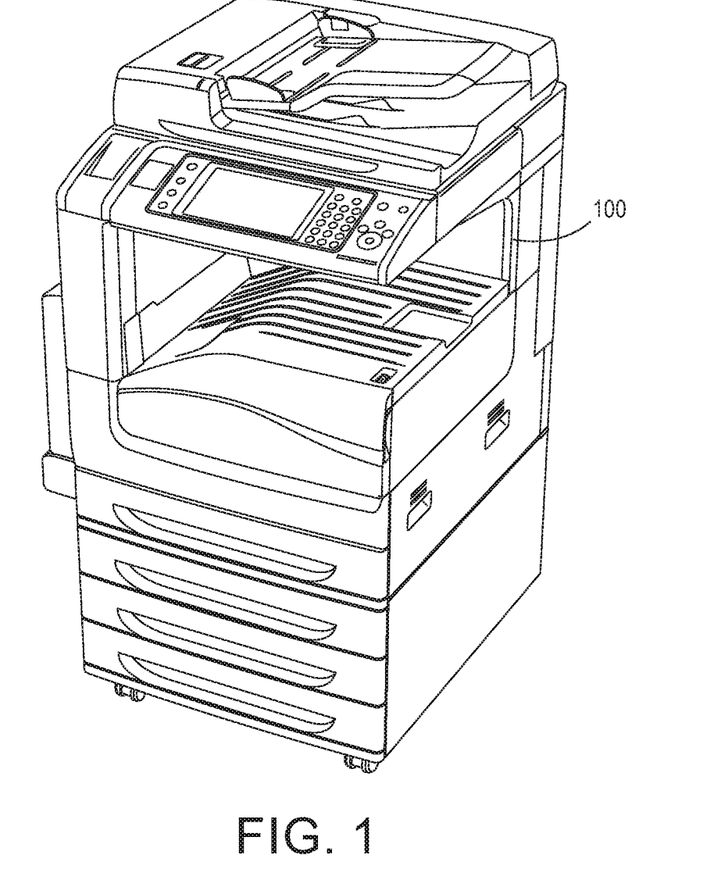
FIG. 1 shows an exemplary physical multi-function device (MFD), in accordance with an embodiment of the present disclosure.

FIG. 1 illustrates an exemplary physical multi-function device (MFD) 100 according to an embodiment of the present disclosure. The multi-function device 100 may be used by a number of users for one or more services such as print, email, scan, workflows, copy, fax, or the like. The multi-function device 100 may be a single device or a combination of multiple devices to perform more than one function such as, but not limited to, printing, scanning, imaging, photocopying, and so forth. The multi-function device 100 may include software, hardware, firmware, and combination thereof. In place of the multi-function device 100, the disclosure may include a printer, a multi-function peripheral device, a multi-function printer and so on. As shown in FIG. 1, the multi-function device 100 is a stand-alone device. But the multi-function device 100 may be communicatively coupled to other devices (other multi-function devices, etc.,) via a suitable network (although not shown). The network may be a wired network, a wireless network or a combination of these. The network may be an individual network or a collection of many such individual networks, interconnected with each other and functioning as a single large network, e.g., the Internet or an intranet. The network may be implemented as one of the different types of networks, such as intranet, local area network (LAN), wide area network (WAN), the internet, near field communication (NFC), and such networks. The network may either be a dedicated network or a shared network, which represents an association of the different types of networks that use a variety of protocols. The network may include network devices, such as network switches, hubs, routers, HBAs, for providing a communication link between the multi-function device 100 and other connected devices/systems such as other multi-function device and/or computing devices.

In context of the present disclosure, the multi-function device 100 directly prints an address on an output medium. To this end, the multi-function device 100 provides a user interface for displaying an address print option to a user. The address print option enables the user to provide address details directly in the multi-function device 100 and print the address details on an output medium like paper, envelope, etc. The user selects the address print option to print at least one address and one or more details on the output medium. The address can include any printable information that can be associated with a print job for any purpose and may include or consist entirely of machine-readable information. The machine-readable information may be derived from any source, including being converted from human-entered information, i.e., the information entered by the user. The multi-function device 100 displays an address form to be filled by the user based on the selection of the address print option on the user interface. The address form includes address fields and print options. The address form requires address details of a receiver and may optionally require address details of a sender. The address details of the receiver may include complete address of the receiver such as flat, city, state, country, pin code, contact number, etc. While the address details of the sender may include at least one detail such as a contact number. But other details of the sender may be included. The address form discussed here is exemplary and may be include any fields/details required for implementing the present disclosure.

The multi-function device 100 receives address details from the user via the user interface. Based on the received address details, the multi-function device 100 prints the address details on the output medium. The output medium may be a paper or an envelope. If the envelope is available with the multi-function device 100, the multi-function device 100 prints the address on the envelope. In case the envelope is not available with the multi-function device 100, the address is printed on a paper. The paper with the printed address may then be pasted on a shipment box, a parcel box, an envelope, a carton box or the like. In this manner, the user can print the address on the output medium directly at the multi-function device 100.

Figure 2:
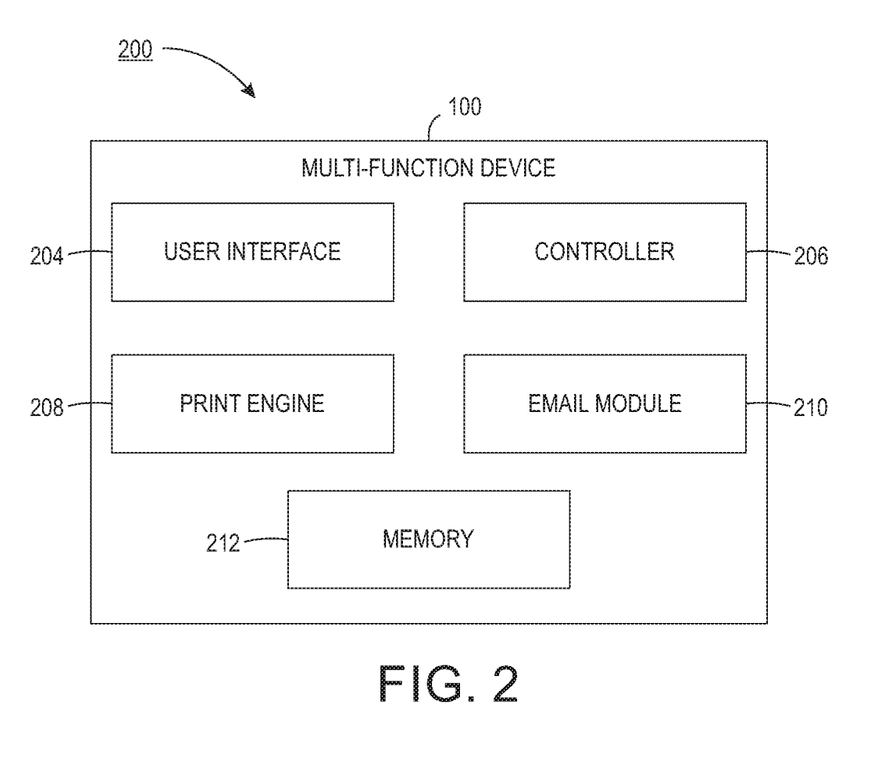
FIG. 2 is a block diagram illustrating various components of an exemplary multi-function device, in accordance with an embodiment of the present disclosure.

FIG. 2 is a block diagram 200 illustrating various components of an exemplary multi-function device 100, in accordance with an embodiment of the present disclosure.

As shown, the multi-function device 100 includes a user interface 204, a controller 206, a print engine 208, an electronic mail (email) module 210, and a memory 212. Each of the components 204-212 is connected to each other via a conventional bus or a later developed protocol. Further, each of the components 204-212 communicates with each other for performing various functions of the current disclosure.

As discussed with reference to FIG. 2, the user accesses the multi-function device 100. To access the multi-function device 100, the user may be required to input login credentials. The login credentials may include biometrics of the user like a username, password, a finger scan, thumb scan, face scan, etc., a card scan, a code scan, and so forth. Upon successful login, the multi-function device 100 proceeds further and displays a user interface 204 to the user.

The user interface 204 displays an address print option to the user. The user selects the address print option displayed on the user interface 204 and the selection of the address print option enables the user to provide/type address directly at the multi-function device 100.

Based on receiving a selection of the address print option, the controller 206 displays an address form to the user on the user interface 204. The address form requires address details. The address form is in a pre-defined format and includes various address fields and print options/details. Various examples of the fields include receiver's fields and/or sender's fields. The receiver's fields include name of a receiver, address of the receiver, zip code of the receiver, mobile of the receiver. The sender's fields include name of a sender, address of the sender, zip code the sender, mobile of the sender. Other options include font, font size, paper select, print option, save in template, etc. The option font allows the user to select a font type to be used for printing the address. The font size option allows the user to select a font size. The paper select option allows the user to select a paper type. In an example, the user selects a paper tray for selecting a type of a paper/output medium at the multi-function device 100. The print option allows the user to submit a print command for printing the address provided by the user. The save in template option allows the user to save the filled out address details/form as a template. Examples of the output medium may include, but are not limited to, a paper, a fabric, a plastic, an envelope, a bag, a wood, and so forth.

The user provides address details via the user interface. At the time of providing the address details, the user provides input corresponding to options such as output medium, font, font size, print, save in template, and so on. The user selects a type of output medium such as a paper, an envelope or other type of output medium. The controller 206 receives the selection of the output medium and address details to be printed on the selected output medium. The controller 206 passes the received details to a print engine 208. The print engine 208 prints the address details on the output medium selected by the user.

In some cases, the output medium is an envelope on which the address is printed. The envelope with the printed address can be directly shipped to the receiver's address. The envelope may include any item to be sent to the receiver such as a letter, card, documents, or any other item. In some cases, where the output medium is a paper, the address provided by the user is first printed on the paper. The paper with printed address is then pasted on an envelope/parcel to be sent to the receiver. The task of pasting is performed by a finisher (although not shown) of the multi-function device 100.

In some cases, the filled out address details are saved as a template in the memory 212 for later retrieval and/or use. The user may save the template under a name. For example, the user saves the template as a Company Name ABC, John NY, MS-Seattle, and so forth. Alternatively, the address template may be saved in a remote storage device, for example, a server, a cloud storage device, and so forth. The saved template is sent by the email module 210 to at least one of one or more multi-function devices connected to the multi-function device 100 via a network and one or more users such that the users and other multi-function devices can use the template for printing the addresses and details. In a non-limiting example, the multi-function device 100 sends the saved template as a PDF document in an email (via the email module 210) to the other multi-function devices and/or the one or more users. In some embodiments, the multi-function device 100 shares an address of the storage location of the saved template with the other users. The other users can access the saved template via the address (or link) and use the same for printing.

In some embodiments, the controller 206 may adjust one or more print properties prior to printing the address details based on the selected output medium. The one or more print properties may include, but are not limited to, a font type, a font size, font color, a text color option, left and right margins, paper/output medium type, and so forth. For example, if the selected output medium is an envelope, the multi-function device 100 adjusts or reduces the font size according to a printing area of the envelope. For example, if the output medium is a small envelope then the controller 206 adjusts the font size according to the small envelope.

Figure 3:
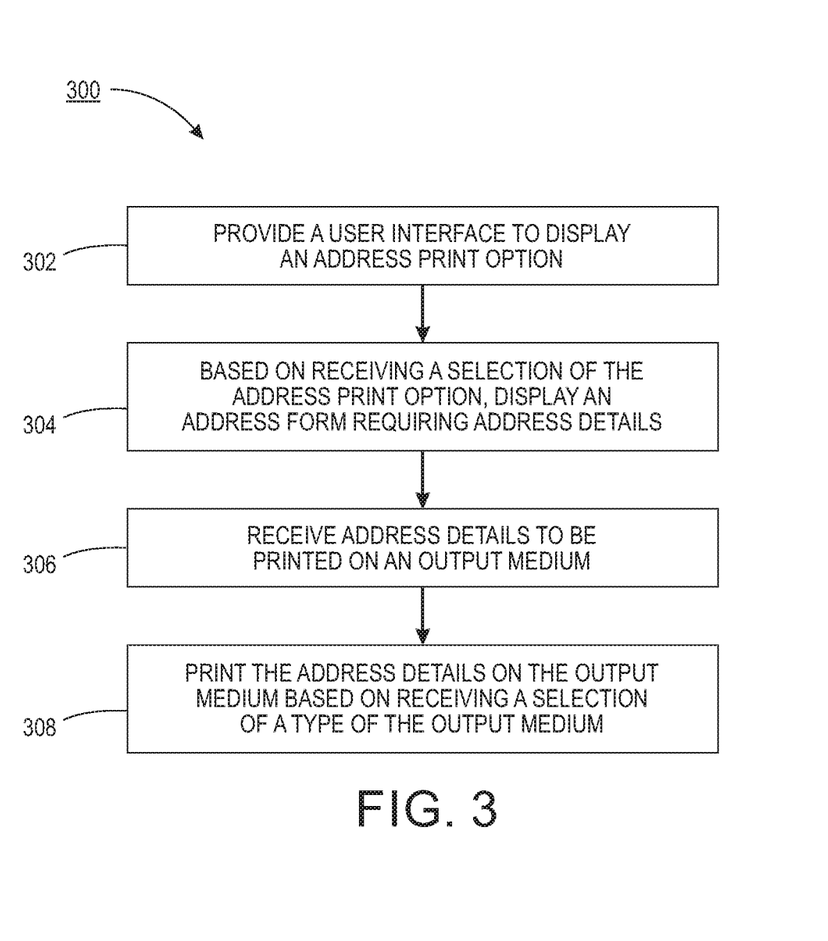
FIG. 3 is a flowchart illustrating an exemplary method for printing one or more addresses directly on an output medium, in accordance with an embodiment of the present disclosure.

FIG. 3 is a method flowchart 300 for printing one or more addresses on an output medium. The method 300 may be implemented by a multi-function device or an equivalent device having printing capabilities. The method 300 is implemented such that a user can directly enter the address at the multi-function device and may not require any other computing device like a computer, for entering the address. Once entered, the address can be printed by the same multi-function device.

The method begins with when the user accesses the multi-function device. At block 302, a user interface is provided to display an address print option for the user. The user selects the address print option via the user interface for printing at least one address and one or more details of a sender and/or a receiver. Then at block 304, based on receiving a selection of the address print option, an address form is displayed on the user interface. The address form includes one or more address fields and one or more print options such as font select, font size select, output medium select, save template option, print option, etc. The user requires to provide address details in the address fields. The address fields may be, but are not limited to, street address, flat/apartment/house/plot number, postal code, city, country, name, mobile number, and so forth. The address fields may be of a receiver. The address fields may be of a sender. In an example, the address fields for the receiver may be state, city, street, mobile, etc. But the address fields for the sender may only include mobile but may include other fields. Based on the address fields in the address form, the user provides address details. The address details may include any printable information that can be associated with a print job for any purpose and may include or consist entirely of machine-readable information. The machine-readable information may be derived from any source, including being converted from human-entered information, i.e., the information entered by the user. Further, the user selects the print options and provide input to the selected print options. For example, the user provides font type for the font option. The user provides font size for the font size option. The user provide type of medium for the output medium select option. The user may select A4, A3, A2 output medium or may select a tray for the same. Examples of the output medium may include, but are not limited to, a paper, a fabric, a plastic, an envelope, a bag, a wood, and so forth. The envelope can include any object including a printable substrate for any purpose, including but not limited to, adhesive shipping labels, covers, cover sheets, tags, cards, wrappers, etc. Similarly, the user provides input to the print options as required. The address form as discussed herein is an exemplary address form and other formats for the address form may be implemented. The user provides the address details and the type of output medium on which the address is to be printed. In this way, the address form is filled out by the user.

At 306, the address details to be printed on the output medium is received. Along with the address details, a selection of a type of output medium is received. Prior to printing, one or more print properties may be adjusted based on the selected output medium. The one or more print properties may include, but are not limited to, a font type, a font size, font color, left and right margins, and so forth. Based on the type of the selected output medium, the address details are printed on the selected output medium at 308. For example, if the user selects a tray 1 including A4 sheets, then the address is printed on an A4 sheet. In this manner, the method enables the user to print the address on the output medium without requiring an external device.

The filled-out address form can be saved in a memory as a template for later retrieval and/or use. The saved template is sent to at least one of one or more multi-function devices and one or more users. The address form may be saved via the save option given in the address form.

The method may be implemented in the form of a non-transitory computer-readable medium comprising instructions executable by a processing resource to provide a user interface to display an address print option; provide an address form requiring address details on the user interface, wherein the user provides the address details via the user interface; receive the address details to be printed on the output medium; and print the address details on the output medium based on receiving a selection of a type of the output medium. The non-transitory computer-readable medium includes instructions executable by the processing resource to save the filled out address details as a template for later retrieval and/or use. The non-transitory computer-readable medium includes instructions executable by the processing resource to automatically adjust one or more print properties based on the selected output medium. The non-transitory computer-readable medium includes instructions executable by the processing resource, wherein the address details comprises at least an address of a receiver. The non-transitory computer-readable medium includes instructions executable by the processing resource, wherein the address details comprises at least one detail of a sender.

Exemplary Screenshots

Figure 4A:
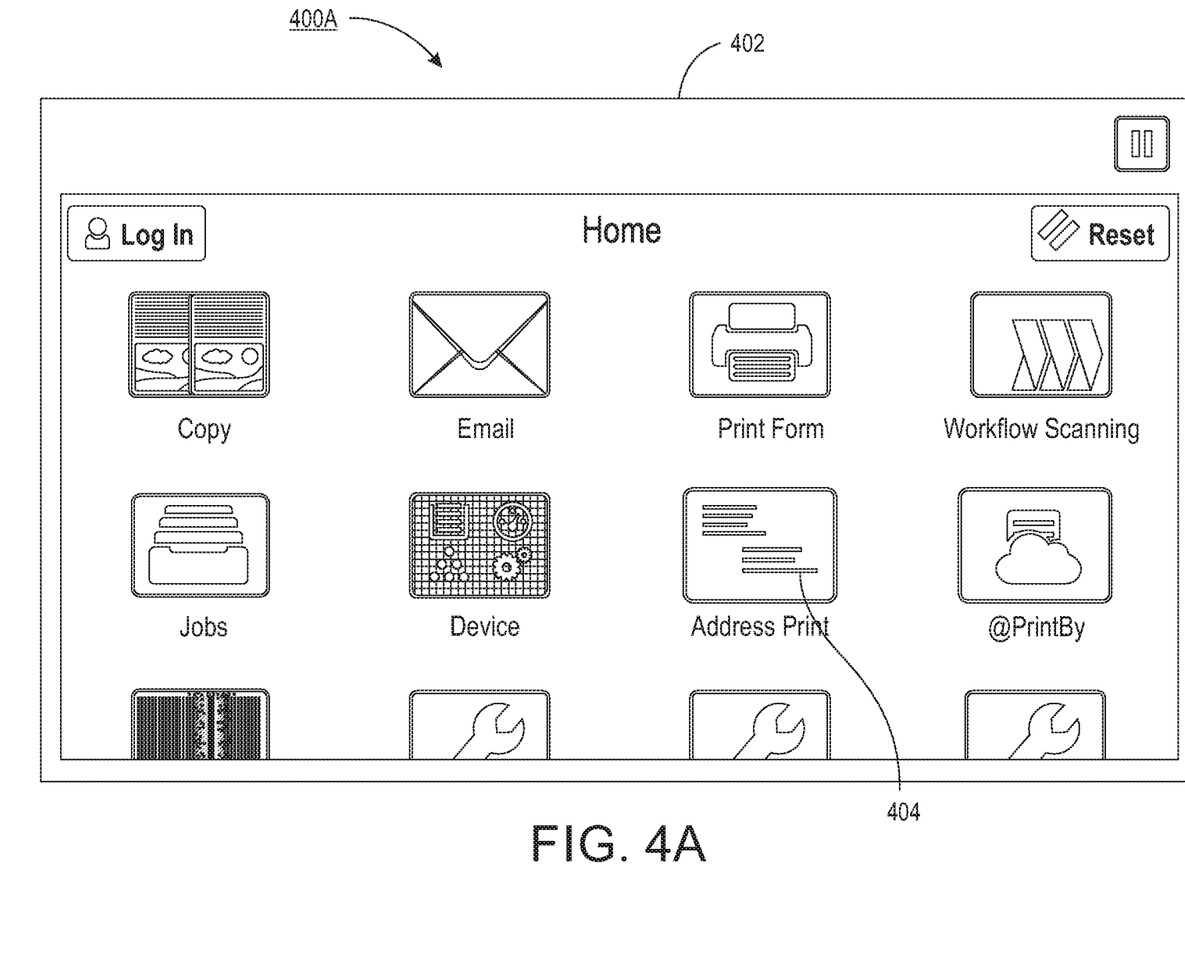
FIGS. 4A-4C show various screenshots for printing at least one address at a multi-function device, in accordance with an embodiment of the present disclosure.
Figure 4B:
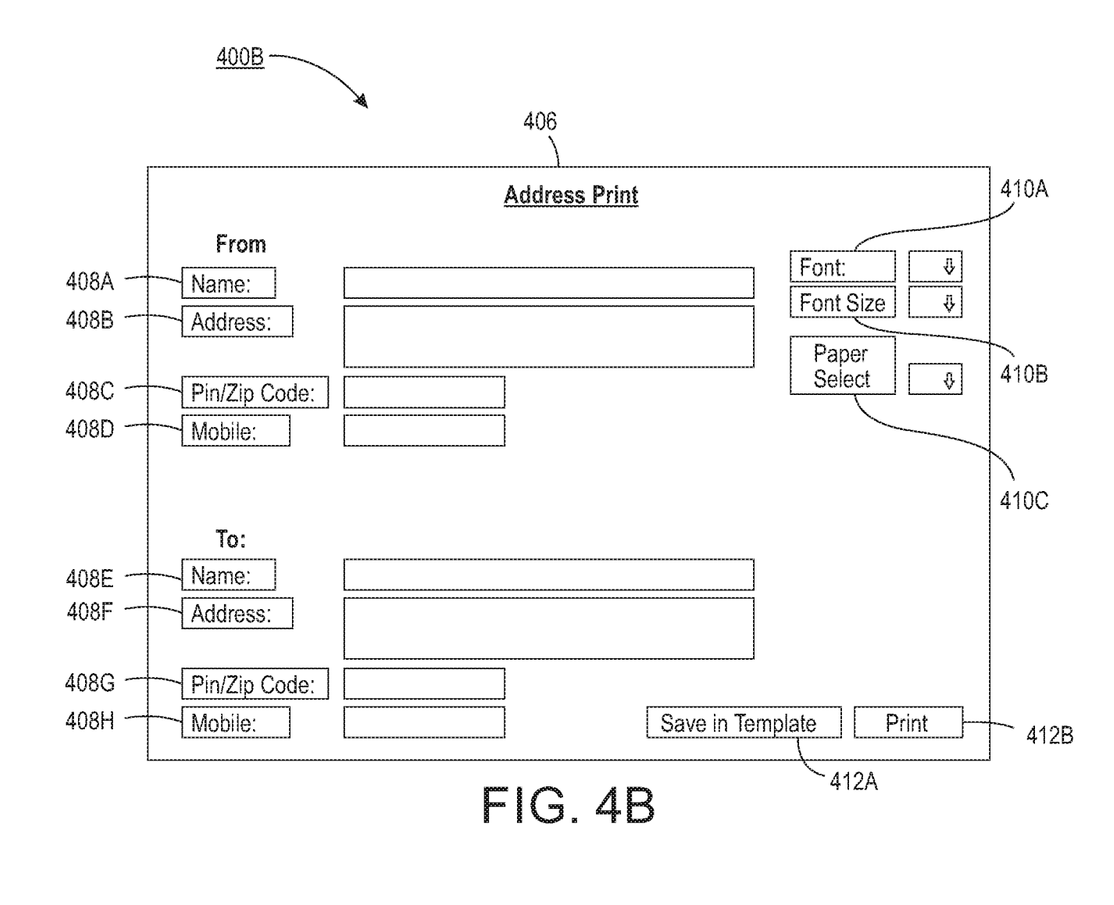

Various screenshots are discussed in FIGS. 4A-4C. FIG. 4A shows a screenshot 400A of a user interface 402 of the multi-function device 100. The user interface 402 displays an address print option 404. The user interface 402 may be touch interface. The user may touch the option 404 to select the option 404. Upon selecting the option 404, an address form 406 is provided as shown in the screenshot 400B. The address form 406 is displayed in the screenshot 400B. The address form 406 includes one or more address fields 408A-408H and print options 410A-410C, and 412A-412B. The address fields 408A-408D require address details of a receiver such as name 408A, address 408B, Zip Code 408C, mobile 408D. The address fields 408E-408H require address details of a sender such as name 408E, address 408F, Zip Code 408G, mobile 408H. The print options 410A-410C and 412A-412B include print options such as font 410A, font size 410B, paper select 410C, save in template 412A and a print option 412B.

Figure 4C:
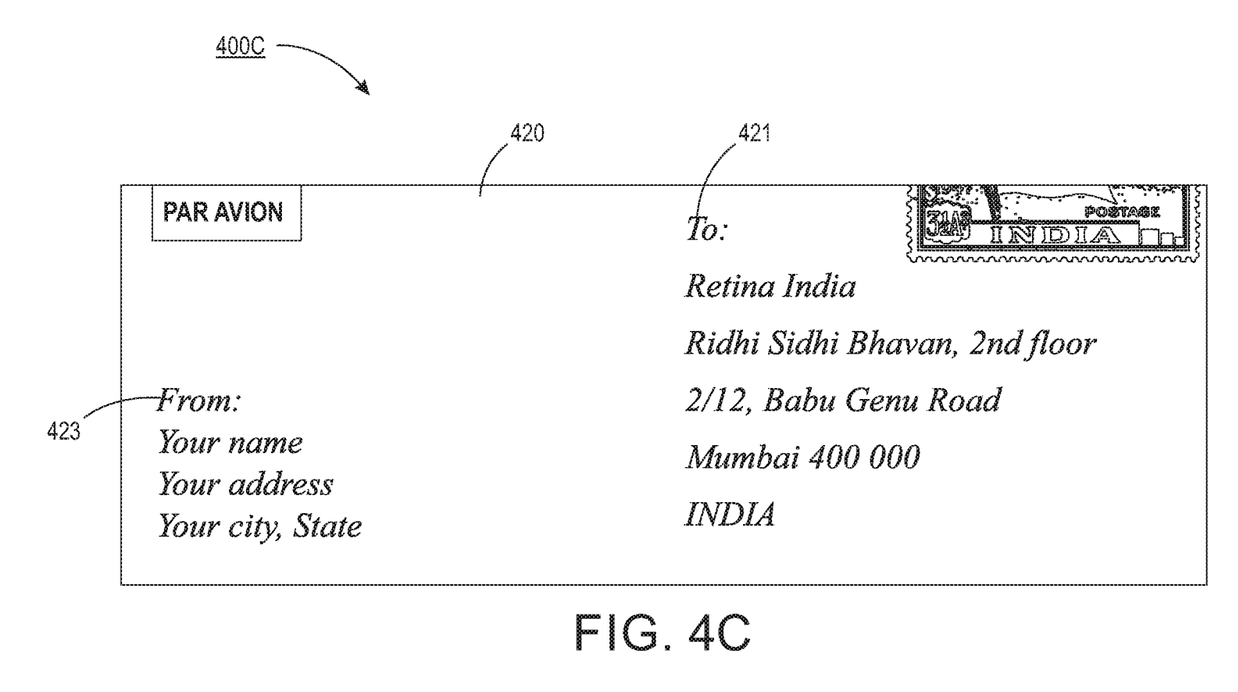

The print options 410A-410C enable the user to adjust or update one or more print properties. Examples of the print properties may include, but are not limited to, a font type, font size, a paper type selection, and so forth. The option 410A allows the user to provide font style for the address details. The option 410B allows the user to provide font size for the address. The option 410C allows the user to select type of paper on which the address details are to be printed. The option 412A allows the user to save the filled out address form. The option 412B allows the user to submit a print command for printing address. Each of the options 410A-410C may allow the user to select print properties from a drop-down list. For example, the user selects an output medium by selecting a paper tray from a drop down list in the paper select option 410C. Though not shown, but the address form 406 may include more than three options for updating the print properties. After the address form is filled out by the user, the user selects the option 412B and the address is printed as shown in the screenshot 400C of FIG. 4C. The screenshot 400C illustrates the address printed on the output medium 420. The address includes an address of a receiver (marked as 421) and an address of a sender (marked as 423).

The present disclosure may be helpful in many manufacturing companies that require an operator (or a person) for courier services in their departments. The present disclosure may directly be implemented by courier companies that have a huge number of consignment or couriers to be sent on daily basis. The present disclosure may be implemented by any organization or individual users who have the requirement of inputting address and then printing or saving the provided address on an output medium such as an envelope, paper, or the like.

The present disclosure provides methods and systems for printing address on an output medium. The methods and systems implement a feature of address print option in a device such as a multi-function device. The option enables a user to directly provide/enter address details into a multi-function device and print onto supported output medium such as a paper, an envelope, etc. The methods and systems perform auto-scaling of font size to fit the address details on the output medium. For example, the user selects a font name and a font size for printing the address and one or more details. In cases, when the size exceeds beyond the paper size, i.e., the output medium, the multi-function device automatically selects the maximum comfortable font size. The methods and systems provide a 'save' option for enabling the user to save the addresses so that addresses can readily be reused in the future. For example, the save option helps the user to save the frequent used address. The disclosed methods and systems provide a simple and fast way to print addressed envelopes without the need of a computer or other computing device. Such methods and systems particularly helpful in Kiosk-based settings, like hotels, airports, and office supply centres without limiting the scope of the disclosure. The methods and systems use a single device for inputting address and printing the input address on the output medium and thus, avoid the need of any other device.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the present disclosure, numerous references may be made regarding services, units, modules, interfaces, devices, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, within the context of the present disclosure, the disclosed devices or units are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that in the present disclosure all of these and similar terms are to be associated with the appropriate physical quantities and are merely convenient labels applied to these quantities. Unless specifically stated otherwise, as apparent from the discussion herein, it is appreciated that throughout the description, disclosure utilizing terms such as "providing," or "receiving," or "adjusting," or "saving," or "printing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary implementations also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the present disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the implementations and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing one or more addresses directly on an output medium, comprising:
   at a multi-function device:
   providing a user interface for displaying an address print option;
   based on receiving a selection of the address print option, displaying, by a controller, an address form requiring address details on the user interface, wherein a user provides the address details via the user interface, and wherein the address form further comprises at least an option to select a type of the output medium, a font, and a font size, and a save template option allowing the address form to be saved as a template;
   receiving, by the controller, an output medium type selection and the address details to be printed on the output medium; and
   automatically adjusting, by the controller, one or more print properties based on receiving the selection of the type of the output medium, wherein the one or more print properties include a controller selected font size based on a print area of the output medium,
   printing, by a printing engine, the address details on the output medium based on receiving the selection of the type of the output medium and in accordance with the adjusted one or more print properties,
   wherein the method enables the user to print the one or more addresses on the output medium without requiring an external device.

2. The method of claim 1, wherein the address details comprise at least an address of a receiver.

3. The method of claim 1, wherein the address details comprise at least one detail of a sender.

4. The method of claim 1, further comprising pasting, by a finisher, the printed address details on a parcel.

5. The method of claim 1, further comprising saving, in a memory, a filled out address form as a template for later retrieval and/or use.

6. The method of claim 5, further comprising sending, by an email module, the saved template to at least one of one or more multi-function devices and one or more users.

7. The method of claim 1, wherein the address form comprising one or more address fields and one or more print options.

8. A multi-function device, comprising:
   a user interface to display an address print option;
   a controller to:
   display an address form requiring address details, on the user interface, upon receiving a selection of the address print option, wherein a user provides the address details via the user interface, and wherein the address form further comprises at least an option to select a type of an output medium, a font, and a font size, and a save template option allowing the address form to be saved as a template; and
   receive an output medium type selection and the address details to be printed on the output medium;
   automatically adjust one or more print properties based on receiving a selection of the type of the output medium, wherein the one or more print properties include a controller selected font size based on a print area of the output medium, and
   a printing engine to print the received address details on the output medium based on receiving the selection of the type of the output medium and in accordance with the adjusted one or more print properties, wherein the multi-function device enables the user to print the address on the output medium without requiring an external device.

9. The multi-function device of claim 8 further comprising a memory to save a filled out address form as a template for later retrieval and/or use.

10. The multi-function device of claim 9 further comprising an email module to send the saved template to at least one of one or more multi-function devices and one or more users.

11. The multi-function device of claim 8, wherein the address details comprise at least address details of a receiver.

12. The multi-function device of claim 8, wherein the address details comprise at least one detail of a sender.

13. The multi-function device of claim 8, further comprising a finisher to paste the printed address details on a parcel.

14. A non-transitory computer-readable medium comprising instructions executable by a processing resource to:
   provide a user interface to display an address print option;
   provide an address form requiring address details on the user interface, wherein a user provides the address details via the user interface, and wherein the address form further comprises at least an option to select a type of an output medium, a font, a font size, and a save template option allowing the address form to be saved as a template;
   receive, an output medium type selection and the address details to be printed on the output medium;
   automatically adjust one or more print properties based on receiving a selection of the type of the output medium, wherein the one or more print properties include a controller selected font size based on a print area of the output medium; and
   print the address details directly on the output medium based on receiving the selection of the type of the output medium and in accordance with the adjusted one or more print properties.

15. The non-transitory computer-readable medium as claimed in claim 14 comprising instructions executable by the processing resource to save a filled out address form as a template for later retrieval and/or use.

16. The non-transitory computer-readable medium as claimed in claim 14 comprising instructions executable by the processing resource, wherein the address details comprise at least an address of a receiver.

17. The non-transitory computer-readable medium as claimed in claim 14 comprising instructions executable by the processing resource, wherein the address details comprise at least one detail of a sender.

18. A method for printing one or more addresses directly on an output medium by a multi-function device, comprising:
   providing an address print option to a user via a user interface, wherein the user selects a display address option;
   receiving a selection of the address print option;
   upon selection, providing an address form to be filled out by the user, the address form comprising one or more address fields and one or more print options comprising at least an output medium select option, a font selection option, and a font size selection option, and a save template option allowing the address form to be saved as a template;

receiving address details corresponding to the one or more address fields and a selection of the type of the output medium for address printing; and based on the selected output medium, automatically adjusting, by a controller of the multi-function device, one or more print properties, wherein the one or more print properties include a controller selected font size based on a print area of the output medium and printing the address details on the output medium in accordance with the adjusted one or more print properties.

\* \* \* \* \*